(12) United States Patent
van den Acker et al.

(10) Patent No.: US 7,284,988 B2
(45) Date of Patent: Oct. 23, 2007

(54) MECHANICAL AND ELECTRICAL COUPLING SYSTEM

(75) Inventors: Laurens van den Acker, Ann Arbor, MI (US); Jose Paris-Gonzalez, Los Angeles, CA (US); Ronald Miller, Saline, MI (US); Gary Strumolo, Beverly Hills, MI (US); David Wagner, Northville, MI (US); Bryan Goodman, Dearborn, MI (US); David DiMeo, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 256 days.

(21) Appl. No.: 10/745,114

(22) Filed: Dec. 22, 2003

(65) Prior Publication Data
US 2004/0155524 A1   Aug. 12, 2004

Related U.S. Application Data

(60) Provisional application No. 60/437,609, filed on Jan. 4, 2003.

(51) Int. Cl.
*H01R 33/00* (2006.01)
(52) U.S. Cl. ................ 439/34; 439/118; 296/37.8; 296/24.34
(58) Field of Classification Search .............. 439/34, 439/110–122; 174/72 A; 180/311, 312; 307/10.1, 10.8; 296/37.8, 37.14, 24.1, 37.7, 296/24.34; 224/540, 281
See application file for complete search history.

(56) References Cited

U.S. PATENT DOCUMENTS

| 2,943,292 A | * | 6/1960 | Herrmann et al. .......... 439/122 |
|---|---|---|---|
| 3,081,442 A | * | 3/1963 | Platz ........................... 439/94 |
| 3,109,598 A | * | 11/1963 | Morgan ...................... 362/226 |
| 3,321,731 A | * | 5/1967 | Goldbaum .................. 439/120 |
| 3,341,802 A | * | 9/1967 | Baldwin et al. ............ 439/116 |
| 3,451,035 A | * | 6/1969 | Baldwin ..................... 439/117 |
| 3,910,371 A |   | 10/1975 | Magrini |
| 4,074,924 A | * | 2/1978 | Lebecque ...................... 439/1 |
| 4,190,309 A | * | 2/1980 | Glass ......................... 439/118 |
| 4,243,284 A | * | 1/1981 | Humphreys ................. 439/113 |
| 4,537,089 A |   | 8/1985 | Moneta |
| 4,638,666 A |   | 1/1987 | Wong et al. |
| 4,919,625 A | * | 4/1990 | Coutre ....................... 439/118 |
| 4,924,957 A |   | 5/1990 | Gigla |
| 5,259,655 A |   | 11/1993 | Anderson |
| 5,325,275 A |   | 6/1994 | Liu |
| 5,632,183 A |   | 5/1997 | Rixon et al. |
| 5,759,051 A | * | 6/1998 | Cancellieri et al. ......... 439/118 |
| 5,915,776 A |   | 6/1999 | Bieri |
| 6,135,529 A | * | 10/2000 | De Angelis et al. ....... 296/37.8 |
| 6,203,088 B1 | * | 3/2001 | Fernandez et al. ......... 296/37.8 |
| 6,360,629 B2 |   | 3/2002 | Schambre et al. |
| 6,441,510 B1 |   | 8/2002 | Hein et al. |
| 6,752,444 B2 | * | 6/2004 | Kitano et al. ............. 296/184.1 |
| 6,780,020 B2 | * | 8/2004 | Kondo et al. ................. 439/34 |
| 6,840,783 B2 | * | 1/2005 | Wolford et al. ............. 439/110 |
| 6,921,118 B2 | * | 7/2005 | Clark et al. ............... 296/24.34 |

* cited by examiner

*Primary Examiner*—Gary F. Paumen
(74) *Attorney, Agent, or Firm*—Gigette M. Bejin; Borda, Lorenz & Geggie, PLLC

(57) ABSTRACT

A coupling system that allows maximum flexibility for vehicle users to relocate, remove or replace electrical and/or mechanical devices throughout the interior of a vehicle, with several slot openings formed in the vehicle structure and coupling components which provide the connections of the devices to the vehicle, via the slots.

10 Claims, 6 Drawing Sheets

MECHANICAL AND ELECTRICAL COUPLING SYSTEM

CROSS-REFERENCE TO RELATED APPLICATIONS

This Application claims the benefit of U.S. Provisional Application No. 60/437,609, filed Jan. 4, 2003.

BACKGROUND OF THE INVENTION

The invention relates generally to the field of attachment systems and more specifically to method and apparatus for attaching electrical and/or mechanical accessories and other devices to the structure and electrical system of a vehicle.

Currently in motor vehicles, seats, mirrors, foot pedals and the steering wheel are generally the only adjustable features from a relatively fixed pivot point. Most other devices in a vehicle, such as a clock, speedometer, radio, cup holder, door-mounted arm rest, etc., are typically fixed in a particular place and cannot be readily adjusted, moved, removed or substituted by the user. Moreover, such other devices also have limited adjustability. Additionally, the vehicle typically provides electrical access for powered accessories only by way of a cigarette lighter type outlet, which is ordinarily located on the front dashboard and, in some cases, on the rear side of the center console or other locations. The current motor vehicle only allows for limited power connections and only at predetermined locations, resulting in trailing power wires.

Applicants have recognized that It would be desirable to provide a system that allows for a variety of mechanical and electrical devices to be connectable in a variety of locations within the vehicle and subsequently adjustable or removable, such that the user can easily customize or tailor the vehicle to fit the user's needs.

SUMMARY OF THE INVENTION

In one embodiment, a motor vehicle is provided with a plurality of slots that are located in the passenger compartment. The slots run generally parallel to one another and are shown oriented in the direction of travel of the vehicle. The slots each allow at least one electrical and/or mechanical device to be inserted therein for electrical connection and/or mechanical retention. It will be readily understood by one of skill in the art that instead of the longitudinal slots, one or more openings with other configurations or shapes may also be utilized, e.g. laterally, diagonally, or discontinuous. Through these slots, an electrical and/or mechanical connection can be made between an attached device such as a PDA, cup holder, speedometer, clock, display panel, etc., and an electrical system and/or mechanical mounting system located on the underside of the body panel or vehicle structure in which the slot is formed.

By locating slots or other openings in the vehicle, including on the floor, the doors, the roof, side pillars, armrests, and dashboard, an electrical and/or mechanical device can be inserted therein and placed into electrical communication with a power source to drive the electrical devices. The devices include connection components that connect with the underside or the topside of the panel for the purpose of releaseably securing the device within the vehicle. The slots, therefore, allow a user to customize a vehicle to fit the user's needs or preferences.

It is, therefore, an object of the present invention to provide a vehicle structure with a plurality of elongated slots formed into interior portions of the structure into which device locking mechanisms are inserted to provide adjustable and removably rigid connections for such devices to the structure. Further to that object, each slot opening communicates with a corresponding internal cavity beneath an interior surface portion of the vehicle, and the cavity runs continuously with the slot opening and has walls formed by the vehicle structure against which the locking mechanism can obtain a releasable connection between the device and the vehicle structure. The locking mechanism may include a locking clamping action, a locking pin inserted into a socket, a series of teeth in the locking mechanism that may be engaged with corresponding teeth in the in the cavity.

It is a further object of the present invention to provide a coupling component for defining a removably lockable attachment between a device and the structure of a vehicle, wherein the vehicle includes at least one slot opening formed into the structure of the vehicle and the component comprises: a first element that is insertable into the slot at a user designated location; a second element that provides a locking connection between the first element and the structure; and a third element connected between the first and second elements that is adjustable to lock the second element in a position to provide the locking connection.

It is still a further object of the present invention to provide electrical power to devices locked in the slots via one or more power buses within the slot cavities and corresponding electrical connectors associated with the locking mechanisms.

DETAILED DESCRIPTION OF THE INVENTION

Figure 1:
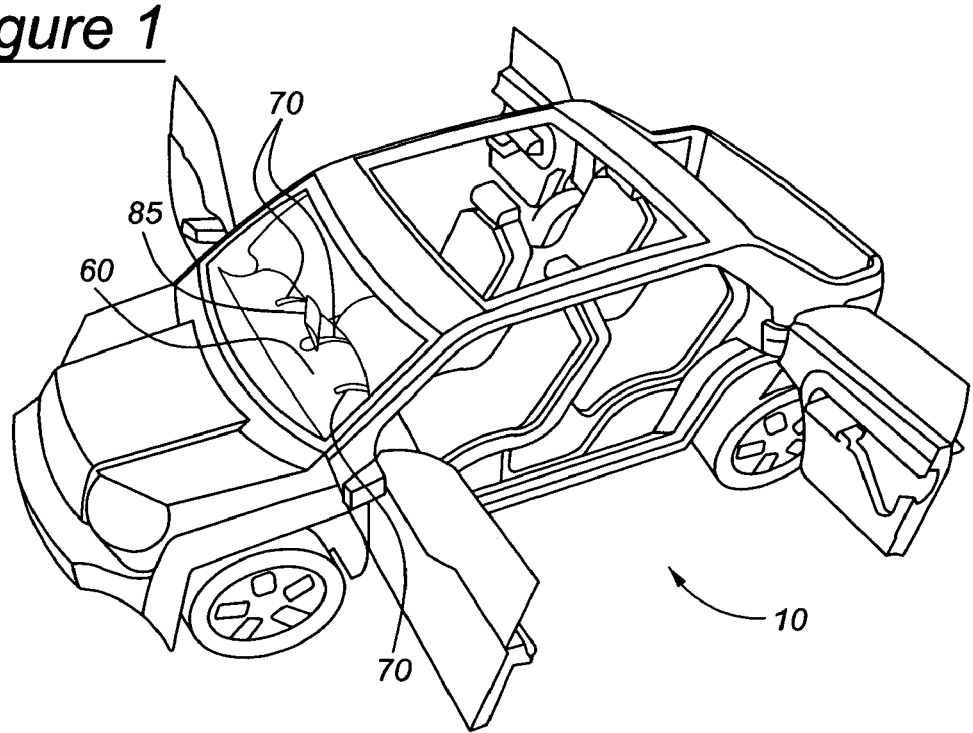
FIG. 1 is a perspective view of a vehicle containing an embodiment of the present invention.
Figure 2:
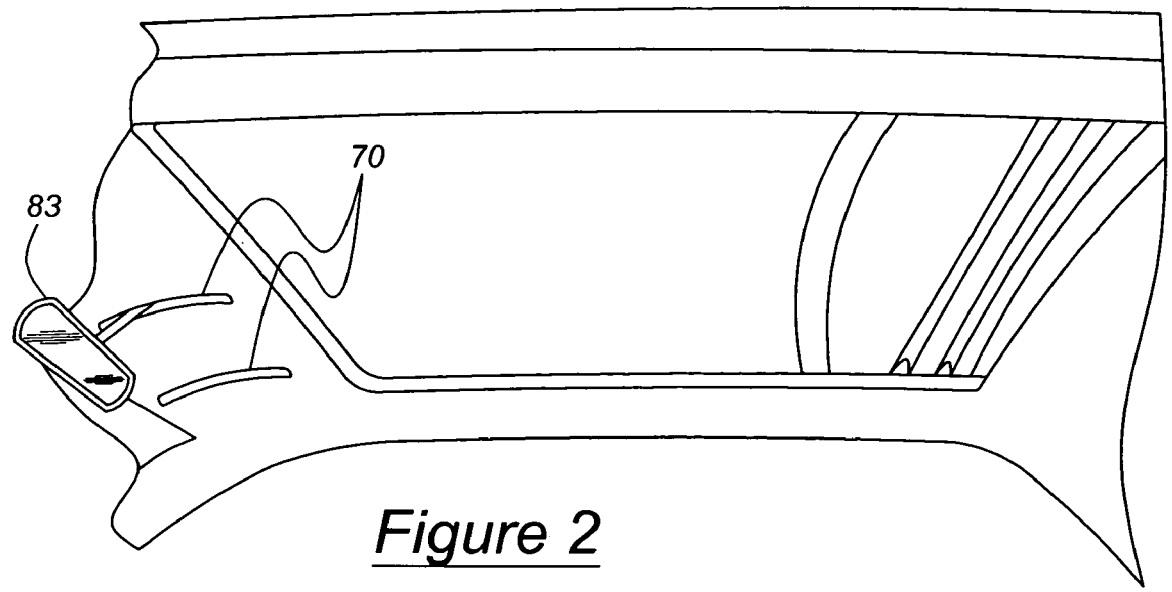
FIG. 2 is a view of a portion of the interior overhead of a vehicle containing adjustable console and mirror embodiments of the present invention.
Figure 3:
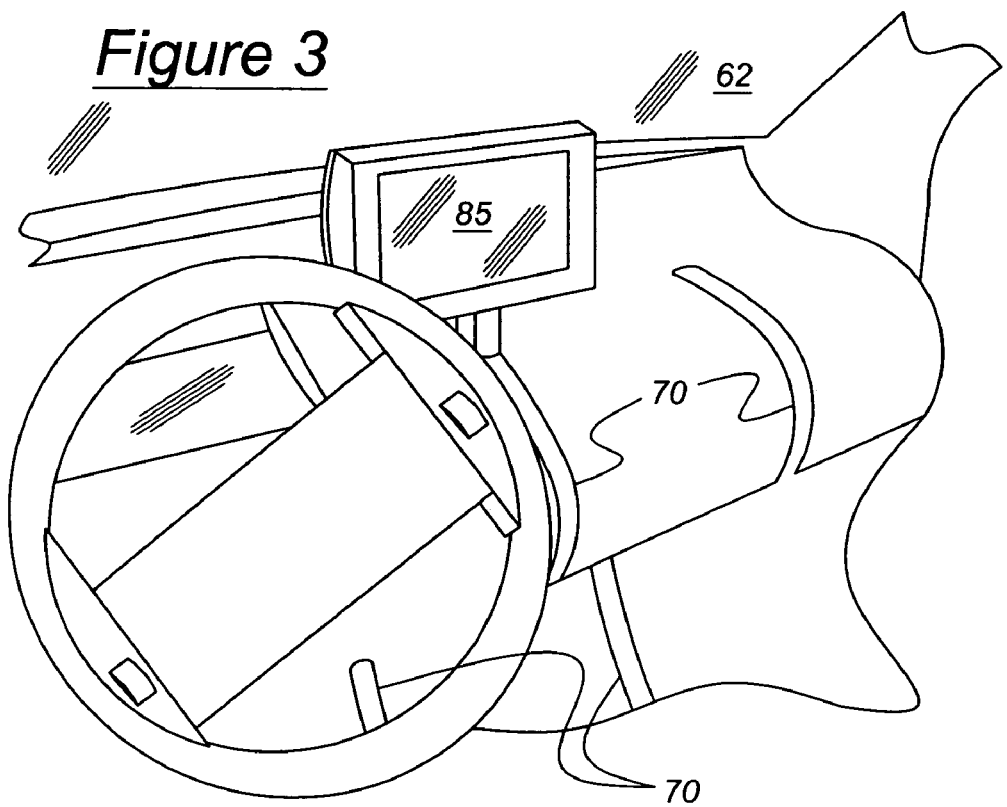
FIG. 3 is a view of a portion of the instrument panel and dashboard located in the passenger compartment containing an adjustable viewing panel and other embodiments of the present invention.

The overall view of the preferred embodiment of the invention is shown in FIG. 1. In FIG. 1, an automotive vehicle 10 contains several slot openings 70 formed into the vehicle structure. Some slots 70 extend from the dashboard 60, beneath the windshield 62, along the floor, between the seats and into the cargo area. Other slots 70 are shown in FIG. 2, as extending along the interior overhead. In each slot 70, various devices may be installed, such as an information console or a mirror 83, as desired by the vehicle operator. For instance, this slot concept allows a passenger to adjust a map light or cosmetic light positioned within a slot 70 in the roof of the passenger compartment to provide for their ease of use and convenience. As another example, FIGS. 1 and 3 show a display panel 85 (which preferably provides touch screen interaction with an on-board computer) positioned within a slot 70 located in the center of the dashboard 60. The display panel 85 can be detached from this position and inserted in almost any other location within that slot 70 or any other slot 70 in the vehicle. When inserted in slot 70, the display panel 85 is both locked in place and in electrical communication with an on board computer. This provides the driver and or passenger with various information, including diagnostic information, navigational information, as well as allowing the driver or passenger to change certain operating conditions of the vehicle or internet access. Alternatively, the display panel 85 can be positioned in another slot 70 that is formed in the dashboard directly in front of the passenger. This will allow the passenger to more easily access and utilize the display panel 85. The system can also be configured such that the display panel 85 can be located in any of the other slots 70 in the vehicle 10.

Display panel 85 also can be a permanently fixed device that is retractable when not needed. The passenger side of the vehicle 10 allows for easy customization by having slots to accommodate a second screen. Moreover, any of the driver controls, including any of the instruments, the gear shifter, turn signals, speedometer, fuel gauge, etc. can also be similarly positioned and adjusted. In accordance with another feature, the rear view mirror 83 can be positioned within a slot at a variety of different positions to provide easy driver viewing and adjustment.

The seats also may be mounted in slots. For example, the rear seats located in slots, allow them to be moved forward to offer more rear space. Moreover, the rear seats can be removed entirely to create a pickup bed.

Another feature is that slots 70 can provide the rear seat passengers with access to various entertainment devices. For example, slots 70 can allow these passengers to plug in DVD players, computers, or game systems that can be displayed on a screen.

Figure 4:
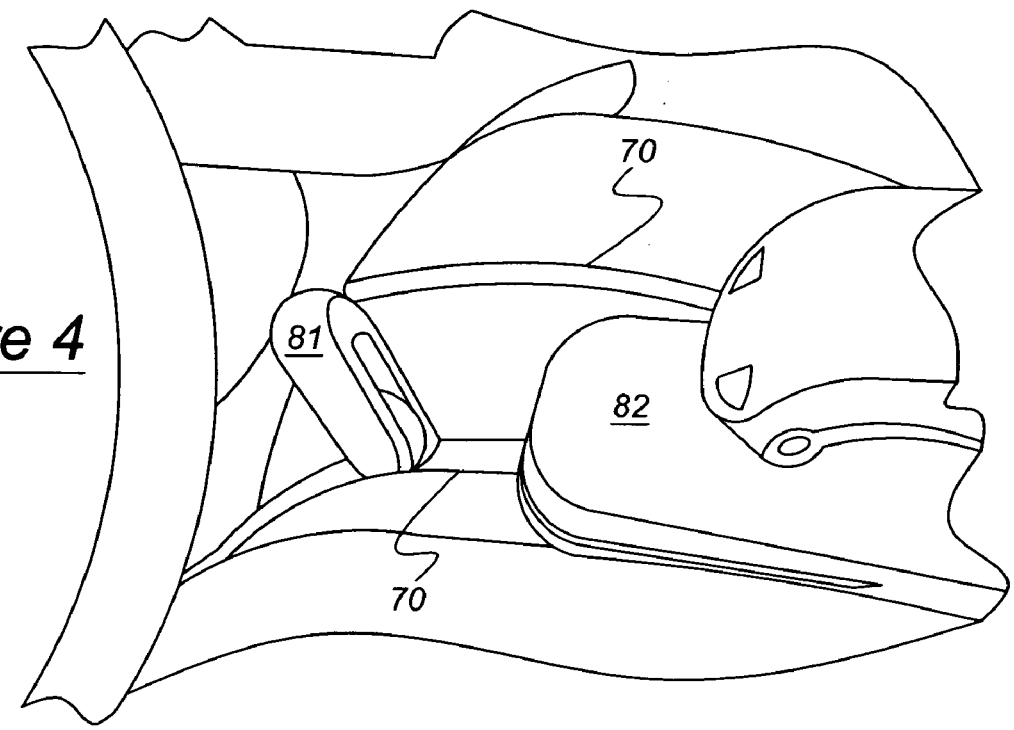
FIG. 4 is a view of the floor area between passenger seats containing adjustable arm rest and emergency brake handle embodiments of the present invention.

FIG. 4 shows that an arm rest 82 can be mounted on slots 70 between the seats to allow adjustment to the most comfortable position by the user. FIG. 4 also shows that an emergency hand brake handle 81 can be located in slot 70 to the desired location of the user. Although not shown, it is understood that one or more slots 70 also may be formed in the doors to provide the up-down or back-forth adjustment of arm rests, cup holders, note pad holders, or the like.

Figure 5:
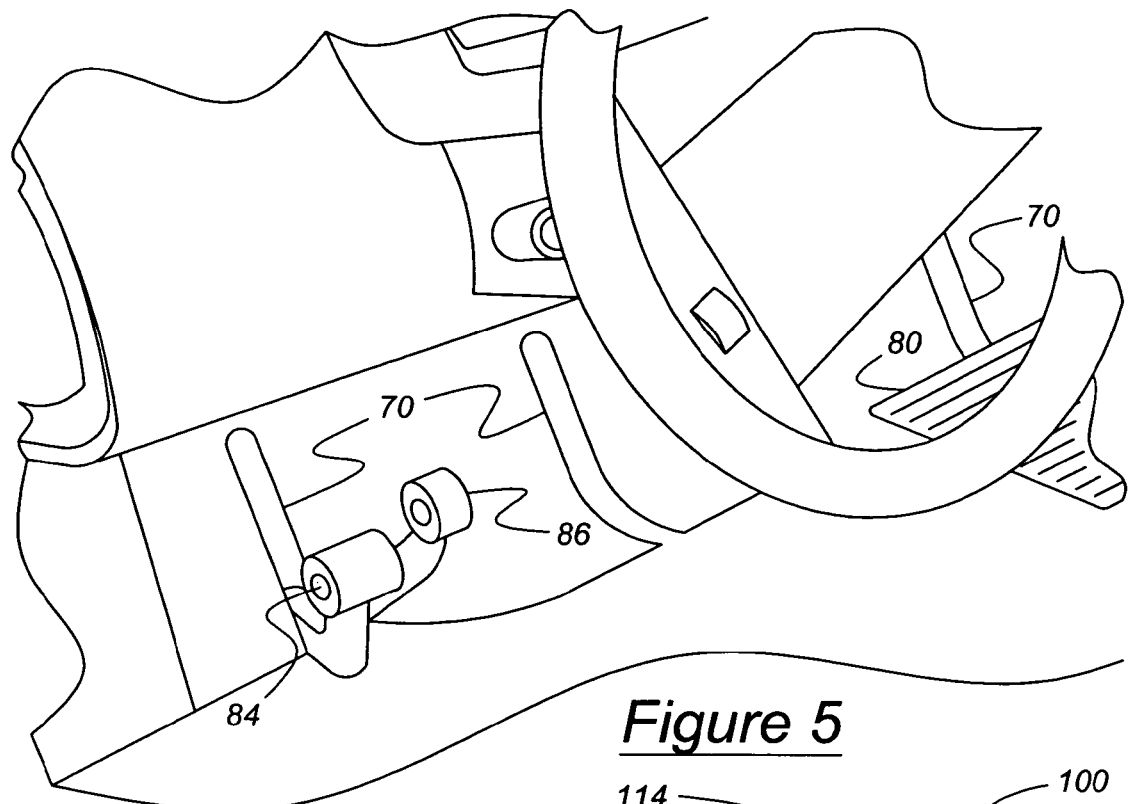
FIG. 5 is a view of a floor area in front of the driver's seat showing an adjustable pedal and floor mat embodiments of the present invention.

In FIG. 5, another feature allows the driver to position the foot pedals in a variety of locations in slot 70 formed in the floor of the passenger compartment. This will allow the driver to adjust the pedal position of both the brake pedal 84 and the accelerator pedal 86 based on his or her height or driving preference.

FIG. 5 also shows, slots 70 located in the floor wells of the passenger compartment. These slots are intended to receive one or more a floor mats 80 therein. The floor mats 80 can be adjusted by the user based on his or her needs. The floor mats 80 are positioned within a slot 70 and are in mechanical connection to the structure. Because the slots 70 have electrical buses therein, the floor mats 80 can be in electrical communication with the system and can be made to provide heat to the feet of the passenger.

Each of the mechanical or electrical components of the vehicle are intended to be received within a slot to allow for easy adjustment thereof and also to place each of the components in electrical communication with the system.

Slots 70 also provide the additional feature of allowing after-market mechanical or electrical devices to be attached thereto for the convenience of the user. For example, instead of having a fixed location for a cup holder that is intended to suit the needs of all passengers regardless of their size and/or shape, a cup holder can be inserted into any slot at any location. The cup holder will then be retained within that slot at a location that is convenient to that particular user so that they can place their drink cup therein.

By way of another example, an electrical device, such as a personal digital assistant ("PDA"), can be plugged into a slot in the roof or at any other location in the vehicle. In one embodiment, a slot 70 is located above each seat (driver, front passenger, and all the rear passenger seats) so that a passenger seated therein can plug a PDA into the onboard computer of the vehicle 10. In one embodiment, the PDA will communicate with the on board computer and allow for easy back up. Once the PDA is plugged into a slot 70 it can also be accessed by the display panel 85.

Additionally, other electrical devices, such as a laptop computer could also be inserted into slot 70 and into communication with a universal system to provide power thereto-. The laptop computer can also communicate with the on board computer as needed. The data communication can be made through either any of the known wireless systems or by the use of a bus contained in the slot cavity.

Figure 6:
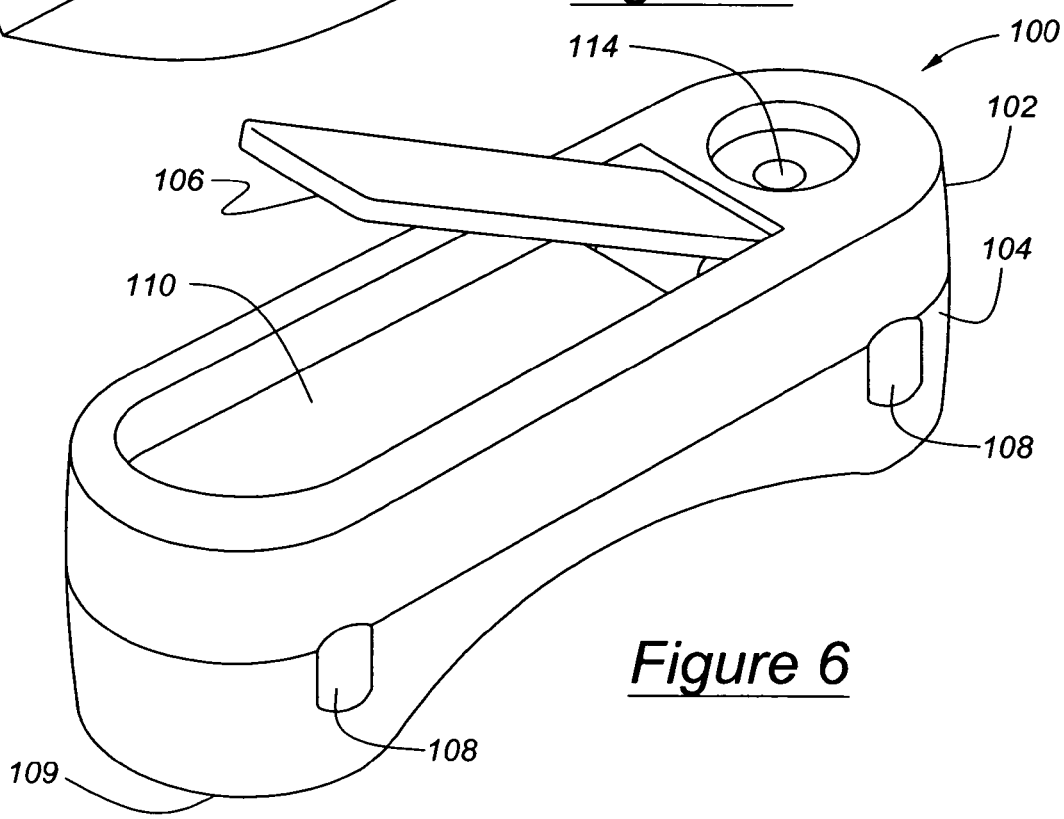
FIG. 6 is a perspective view of an embodiment of a device slot connector as employed in the present invention in its unlocked configuration.
Figure 7:
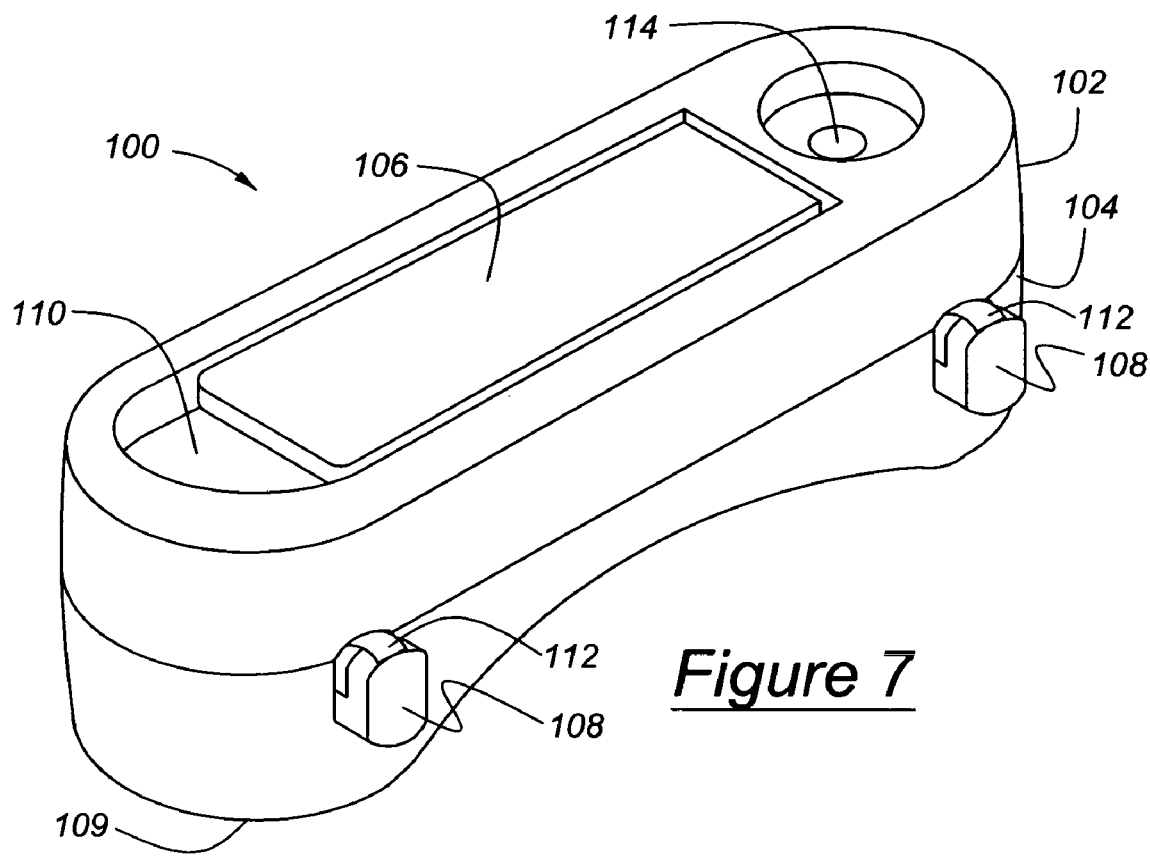
FIG. 7 is a perspective view of the device slot connector, of FIG. 6, in its locked configuration.
Figure 8:
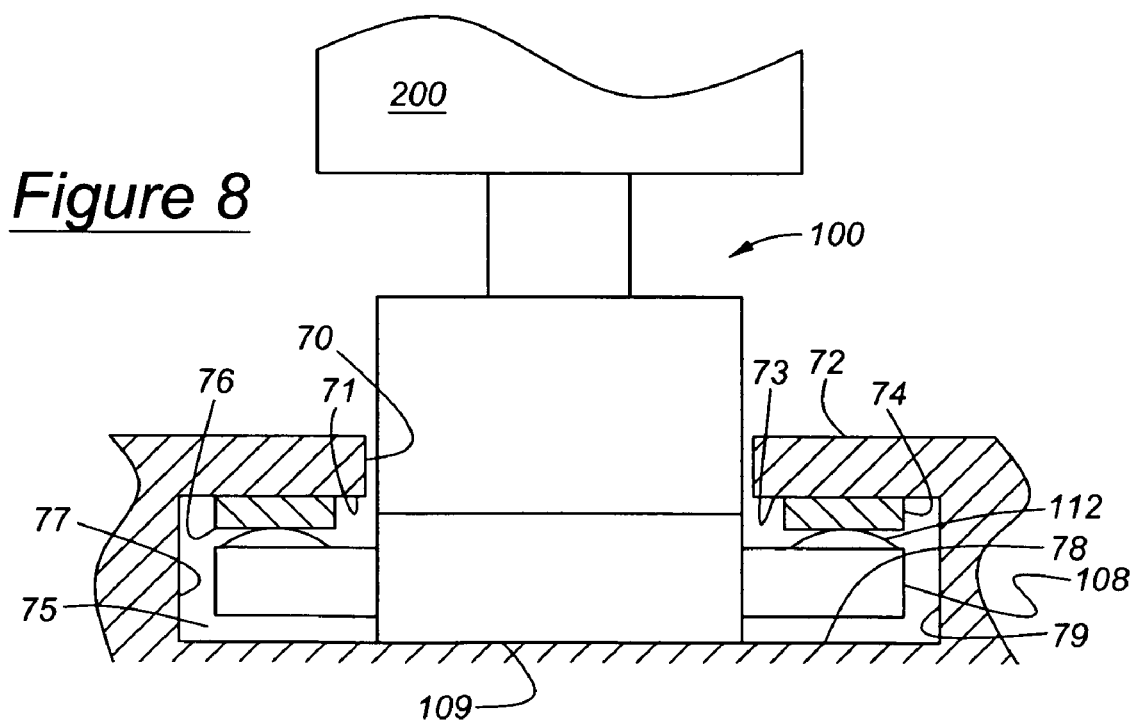
FIG. 8 is a partial cross-sectional view of the device slot connector of FIGS. 6 and 7 shown installed in a slot of the present invention.

Devices, such as those mentioned above, may be integral with or connected to various device slot connectors such as the one shown in FIGS. 6, 7 and 8. Device slot connector 100 is shown in FIG. 6 as being in its unlocked configuration. It includes a first upper body element 102 onto which a device 200 is mounted at socket 114. The socket 114 provides both a mechanical connection and an electrical connection, if the device requires such. Device slot connector 100 further includes a second lower body element 104. The upper and lower body elements are formed to have a width that can fit into the width of slot 70. A third locking element is shown as a lever 106. Four associated retention legs 108 retractably extend from the lower body element 104. The locking lever 106 is mechanically connected to the retention legs 108. When the lever 106 is in its "up" position, as shown in FIG. 6, the retention legs 108 are in their retracted positions. This allows the device slot connector 100 to be inserted into a slot 70 and slid into a desired position along the slot prior to being locked in place. When the lever 106 is adjusted to its "down" position and becomes seated into a lever recess 110, the retention legs 108 are extended and form a friction connection to the upper walls 71 and 73 of slot cavity 75. Device slot connector 100 also includes electrical contacts 112 that are mounted on and extend with retention legs 108.

With reference to FIG. 8, the fully inserted device slot connector 100 is shown in a positioned and locked configuration within slot 70 and bearing a device 200 mounted thereon. Slot 70 defines an elongated opening in the vehicle structure that is in communication with a slot cavity 75. Slot cavity 75 lies below the interior surface 72 of the vehicle structure or trim panel. For convenience, the cavity 75 is shown as having a generally "T" shaped cross-section with the slot opening communicating with the interior of the vehicle at the base of the "T". The cavity 75 is further shown with side walls 77 and 79 of predetermined dimensions to interconnect the structure surface 72, the slot opening and cavity floor 78. In the case of the device slot connector 100 embodiment shown, the bottom surface 109 of the lower element 104 is compressed against the cavity floor 78 when the retention pins 108 are extended to their locked position. Also in FIG. 8, electrical conductors 74 and 76 are shown as respectively attached to upper cavity walls 73 and 71. Conductors 74 and 76 preferably provide electrical power and ground buses, respectively, throughout slot 70.

Figure 9:
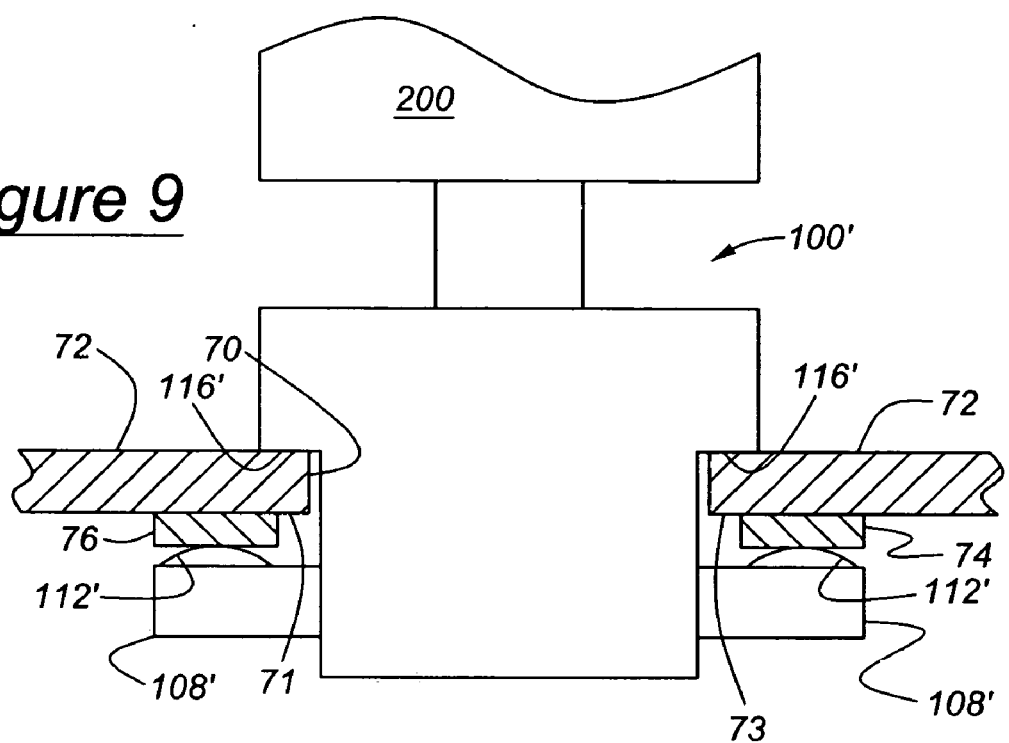
FIG. 9 is a partial cross-sectional view of a first alternative device slot connector configuration that may be employed in the present invention.

In FIG. 9, a second embodiment of a device slot connector 100' is shown. This is similar to the previous embodiment shown in FIGS. 6–8, except that the upper body element has a shoulder 116' which extends past the width of slot 70 and thereby limits the insertion of the device slot connector 100 to a known depth. In this case, when the retention legs 108' are extended by the manual activation of a locking lever 106', the friction connection is made due to compression of the retention legs 018' and electrical contacts 112' against the structure surface 72 and the conductors 74 and 76.

Although not specifically shown, it is conceived that the electrical conductors 74 and 76 also could be located on opposite cavity walls 77 and 79 to allow a friction fit to be made directly against the upper cavity walls by the extendable legs. The electrical connections could then be made through the use of electrical contacts mounted at the ends of the extendable legs and being compressing against the electrical conductors.

Figure 10:
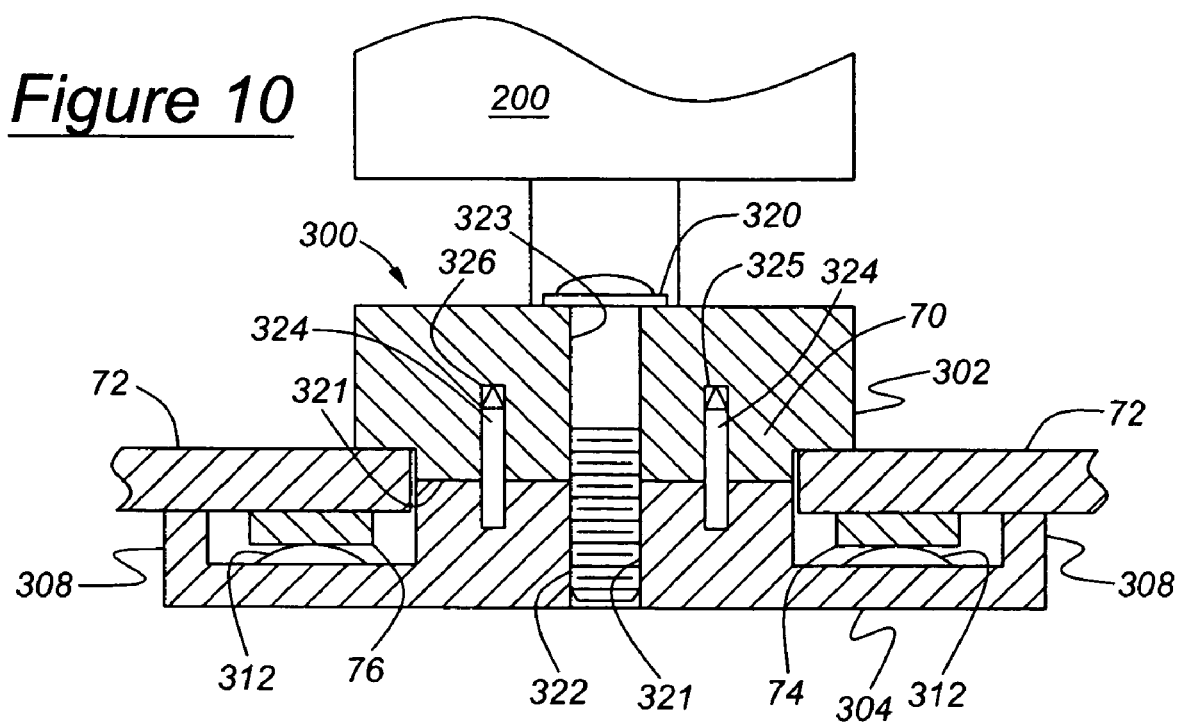
FIG. 10 is a partial cross-sectional view of a second alternative device slot connector configuration that may be employed in the present invention.
Figure 11:
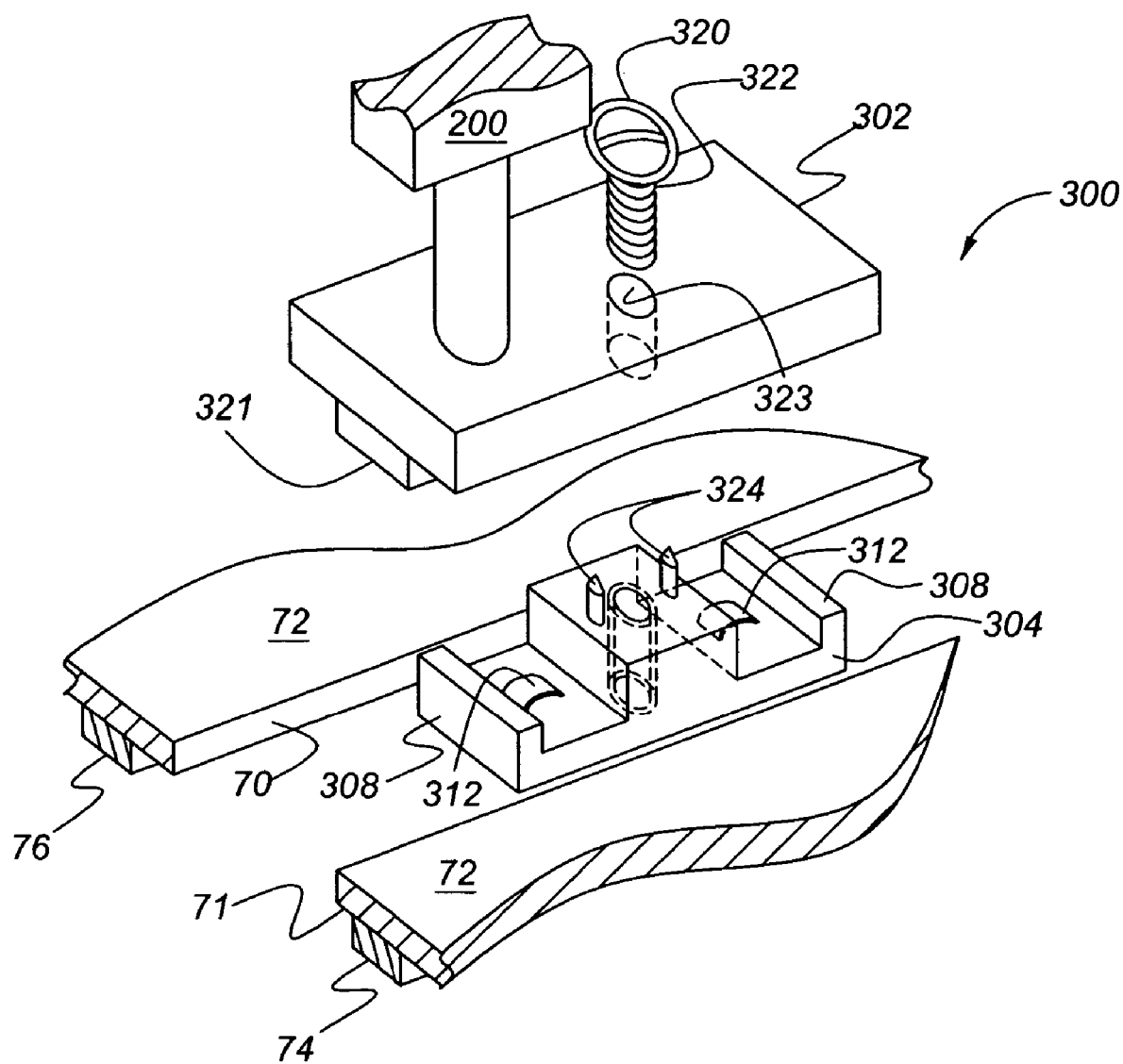
FIG. 11 is an exploded view showing the alignment of elements used to form the second alternative shown in FIG. 10.

A further embodiment of a device slot connector 300 is shown in FIGS. 10 and 11. As in the earlier embodiments, a device 200 is shown mounted to the connector 300. A first upper clamp body element 302 is provided to support the device 200 and provide both mechanical and electrical connections. The upper element 302 is formed to be partially insertable into slot 70 and contains an extension block 321 that corresponds in width to that of slot 70. A second lower clamp body element 30 body 34 is provided with a pair of clamping legs 308 and electrical contacts 312. The lower clamp element 304 further includes a pair of alignment pins 324 that also serve as electrical mating connectors between the contacts 312 and the device 200 when the lower clamp body 304 and the upper clamp body 302 are attached. The lower clamp element 304 is formed to have a width dimension that allows full insertion into slot 70. A 90 degree rotation after insertion into slot cavity 75 allows the contacts 312 to be in registration with electrical conductive strips 74 and 76 on the upper cavity wall 71. A third clamping fastener element 320 is provided to be inserted into an aperture 323 in the upper element 302 and into threaded aperture 321, where the threads 322 of fastener element 320 become engaged. When fastener element 320 is relatively loose, the connector 300 and the device 200 may be inserted and slid to any desired position along slot 70 or removed and relocated to another slot 70. When the lower element 304 is properly rotated crossways to the slot opening, the alignment pins 324 become aligned with corresponding female sockets 326 in the upper element 302. Upon tightening of the fastener element 320, the two clamp elements 302 and 304 become locked in place.

Thus, it can be seen that through a plurality of slots formed in the interior of the vehicle structure, such as the floor, the door panels, the roof, the tail gate and the instrument panel, a variety of different devices can be mounted and moved around. These devices can later be removed, adjusted, or replaced to suit a person's needs. The floor, the panels, the roof, and the dashboard as well and the associated slots are the "hardware" of this universal system, while the instruments, the screens, and all the other accessories that can communicate with slots are the software of the system that may be readily removed and substituted by compatible devices.

From the foregoing, it can be seen that there has been brought to the art a new and improved system for electrically and/or mechanically coupling several devices to the interior of a vehicle with great flexibility to satisfy the desires and convenience of the vehicle users. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

We claim:

1. In an automotive vehicle structure, a plurality of elongated slots being formed into interior portions of said structure into which device locking mechanisms are inserted to provide lockable, adjustable and removable rigid connections of said devices to said structure, wherein each slot opening communicates with a corresponding internal cavity beneath an interior surface portion of the vehicle, said cavity runs continuously with said slot opening, has walls formed by the vehicle structure against which said locking mechanism provides a rotational and frictional locking connection at any location along said slot between said device and said vehicle, wherein said cavity contains at least one electrically conductive bus connected to the vehicle cower supply and serves as a data communication bus, and at least one electrically conductive bus providing electrical ground.

2. A coupling system that attaches a device to an automotive vehicle at a plurality of locations within the interior of said vehicle, including a plurality of elongated slot openings formed into the structure of said vehicle, each device including a coupling portion, and each slot being configured to receive a coupling portion of said device inserted and locked in place at any location along a slot opening that is desired by the user, to provide said device removable and adjustable and equally operational at any location, wherein said device contains a locking element which is rotationally activated to apply a frictional pressure to at least one wall and thereby lock said device in place, and further wherein each slot opening is through an interior surface of the vehicle and extends to a cavity portion that is beneath said surface, said cavity portion contains walls of predetermined dimensions and contains at least one conductive element disposed alone a wall, and at least one of said locking elements has an electrical contact to provide a connection to said conductive element when said device is locked in place.

3. A vehicle structure as in claim 2, wherein said cavity contains at least one electrically conductive bus connected to the vehicle power supply.

4. A vehicle structure as in claim 3, wherein said cavity also contains at least one electrically conductive bus providing electrical ground internal to said slot.

5. A vehicle structure as in claim 3, wherein said conductive bus also serves as a data communication bus.

6. A system, as in claim 2, wherein said plurality of slot openings are formed throughout the vehicle and a plurality of devices are inserted and locked in place at several locations.

7. A system, as in claim 2, wherein said cavity portion contains at least one conductive element that is an electrical power bus and at least one conductive element that is an electrical ground.

8. A system, as in claim 7, wherein said electrical power bus and said electrical ground are disposed on walls that are on opposite sides of said slot opening.

9. A system, as in claim 7, wherein said electrical power bus and said electrical ground are disposed on walls that are in opposition to each other.

10. A system as in claim 2, wherein said device coupling portion comprise:
- a first element that is insertable into said slot at a user designated location;
- a second element that provides a frictional locking connection between said first element and said structure; and
- a third element connected between said first and second elements that is rotationally adjustable to lock said second element in a position to provide said locking connection.

* * * * *